United States Patent
Kiel et al.

(10) Patent No.: US 9,256,514 B2
(45) Date of Patent: Feb. 9, 2016

(54) DEBUGGING AND PERFOMANCE ANALYSIS OF APPLICATIONS

(75) Inventors: Jeffrey Kiel, Raleigh, NC (US); Derek Cornish, Durham, NC (US); Michael Clifford Strauss, Durham, NC (US)

(73) Assignee: NVIDIA CORPORATION, Santa Clara, CA (US)

( * ) Notice: Subject to any disclaimer, the term of this patent is extended or adjusted under 35 U.S.C. 154(b) by 1353 days.

(21) Appl. No.: 12/709,380

(22) Filed: Feb. 19, 2010

(65) Prior Publication Data

US 2010/0211933 A1   Aug. 19, 2010

Related U.S. Application Data (60) Provisional application No. 61/153,944, filed on Feb. 19, 2009.

(51) Int. Cl.
G06F 9/44 (2006.01)
G06F 11/36 (2006.01)

(52) U.S. Cl.
CPC ........ *G06F 11/3636* (2013.01); *G06F 11/3664* (2013.01)

(58) Field of Classification Search
CPC ............. G06F 11/36; G06F 8/20; G06F 8/65; G06F 9/44; G06F 9/54; G06F 9/65
USPC .................................................. 717/125, 127
See application file for complete search history.

(56) References Cited

U.S. PATENT DOCUMENTS

| | | | |
|---|---|---|---|
| 5,268,995 A | 12/1993 | Diefendorff et al. | |
| 5,285,323 A | 2/1994 | Schlapp et al. | |
| 5,487,022 A | 1/1996 | Simpson et al. | |
| 5,613,050 A | 3/1997 | Hochmuth et al. | |
| 5,764,228 A | 6/1998 | Baldwin | |
| 5,777,628 A | 7/1998 | Buck-Gengler | |
| 6,101,524 A | 8/2000 | Choi et al. | |
| 6,166,743 A | 12/2000 | Tanaka | |
| 6,199,082 B1 * | 3/2001 | Ferrel et al. | 715/205 |
| 6,222,550 B1 | 4/2001 | Rosman et al. | |
| 6,288,730 B1 | 9/2001 | Duluk, Jr. et al. | |
| 6,442,748 B1 * | 8/2002 | Bowman-Amuah | 717/108 |
| 6,525,737 B1 | 2/2003 | Duluk, Jr. et al. | |
| 6,542,971 B1 | 4/2003 | Reed | |
| 6,664,958 B1 | 12/2003 | Lather et al. | |
| 6,717,577 B1 | 4/2004 | Cheng et al. | |
| 6,731,288 B2 | 5/2004 | Parsons et al. | |
| 6,738,870 B2 | 5/2004 | Van Huben et al. | |
| 7,034,828 B1 | 4/2006 | Drebin et al. | |
| 7,225,299 B1 | 5/2007 | Rozas et al. | |
| 7,257,814 B1 | 8/2007 | Melvin et al. | |
| 7,376,798 B1 | 5/2008 | Rozas | |

(Continued)

OTHER PUBLICATIONS

Choi et al., "Deterministic Replay of Java Multithread Applications", Aug. 1998, ACM.

(Continued)

*Primary Examiner* — Duy Khuong Nguyen (57) ABSTRACT

While an application is still running and using a resource that the application has already allocated, real-time capture is used to allow for a minimal overhead, quick turnaround solution for debugging and performance analysis. Application programming interface interception can be used to construct a database of resource usage that can then be mined for dependencies.

16 Claims, 4 Drawing Sheets

(56) References Cited

U.S. PATENT DOCUMENTS

| | | | |
|---|---|---|---|
| 7,380,235 B1 | 5/2008 | Fathalla | |
| 7,430,654 B2 | 9/2008 | Huang et al. | |
| 7,506,318 B1 | 3/2009 | Lindo et al. | |
| 7,873,793 B1 | 1/2011 | Rozas et al. | |
| 8,276,129 B1* | 9/2012 | Kiel et al. | 717/140 |
| 8,726,242 B2 | 5/2014 | Ngo | |
| 2002/0083217 A1* | 6/2002 | Ward et al. | 709/328 |
| 2003/0208520 A1* | 11/2003 | Hewitt | 709/102 |
| 2004/0012597 A1 | 1/2004 | Zatz et al. | |
| 2004/0119710 A1 | 6/2004 | Piazza et al. | |
| 2004/0194084 A1 | 9/2004 | Matsunami et al. | |
| 2004/0246260 A1 | 12/2004 | Kim et al. | |
| 2005/0086644 A1 | 4/2005 | Chkodrov et al. | |
| 2005/0162436 A1 | 7/2005 | Van Hook et al. | |
| 2005/0231506 A1 | 10/2005 | Simpson et al. | |
| 2005/0237337 A1 | 10/2005 | Leather et al. | |
| 2005/0273757 A1* | 12/2005 | Anderson | 717/100 |
| 2006/0007234 A1 | 1/2006 | Hutchins et al. | |
| 2006/0059468 A1 | 3/2006 | Heirich | |
| 2007/0204257 A1* | 8/2007 | Kinno et al. | 717/100 |
| 2007/0250820 A1* | 10/2007 | Edwards et al. | 717/131 |
| 2007/0250827 A1 | 10/2007 | Ohyama et al. | |
| 2007/0288902 A1 | 12/2007 | Lev et al. | |
| 2008/0034430 A1* | 2/2008 | Burtscher | 726/23 |
| 2009/0241107 A1 | 9/2009 | Kobayashi | |
| 2010/0211933 A1 | 8/2010 | Kiel et al. | |
| 2012/0144126 A1 | 6/2012 | Nimmala et al. | |
| 2012/0180023 A1 | 7/2012 | Seki | |
| 2014/0181404 A1 | 6/2014 | Chaudhary et al. | |

OTHER PUBLICATIONS

Edelstein et al., "Framework for Testing Multi-Threaded Java Programs", 2003, IBM Research Laboratory.

Lindholm et al., "NVIDIA Tesla: A Unified Graphics and Computing Architecture", 2008.

Geels, "Replay Debugging for Distributed Applications", Dec. 2006, University of California at Berkeley.

* cited by examiner

DEBUGGING AND PERFOMANCE ANALYSIS OF APPLICATIONS

RELATED U.S. APPLICATION

The present application claims priority to the provisional patent application Ser. No. 61/153,944, entitled "Debugging and Performance Analysis of Applications," with filing date Feb. 19, 2009, assigned to the assignee of the present application, and hereby incorporated by reference in its entirety.

BACKGROUND

The content of a single frame in a modern graphics application continues to expand as graphics processing units (GPUs) increase in capability. This can lead to errors and performance problems that are difficult to analyze in real time while the application renders the final image. The use of multiple rendering targets, composited to construct the final image, only contributes to the difficulty of debugging and performance tuning.

Many solutions exist whereby a frame is captured for analysis after the application has exited. The main issue with these solutions is the turnaround time for modifications is excessive for efficient problem detection and solving. Also, such methods can consume excessive resources for storage of the frame information until the analysis is performed.

SUMMARY

In one embodiment, while an application is still running and using a resource (object) that the application has already allocated, real-time capture is used to provide a reduced overhead, quick turnaround solution for debugging and performance analysis. By creating the capture on a running application, the debugging and tuning cycle is reduced by allowing a developer to see a problem and potentially make modifications while the application is live, providing immediate feedback. Also, multiple analysis runs can be made on the same instantiation of the application. Because there is no need to store the captured frame, resource requirements are also reduced.

In one such embodiment, application programming interface (API) interception is used to construct a database of resource usage that is then mined for dependencies. This information can be graphed on a timeline with colored arrows to indicate producers and consumers for API calls. Use of this information can aid a graphics application developer in finding dependencies, fixing unwanted ones, and optimizing desired ones, resulting in more correct and faster frame renderings.

More specifically, in one embodiment, function calls between a graphics application and an API are recorded while operating on a frame of interest. A reference count is maintained for an object created by the API. The reference count can be manipulated such that the API does not delete the object when the object is released by the application. The function calls can then be replayed using the object.

Relationships between the function calls can then be identified. In one embodiment, a graphical user interface (GUI) that shows relationships between the function calls is generated. In one such embodiment, the GUI includes colored arrows that point from a first function call to a second function call that utilizes an object produced by the first function call.

An identifier for a function call and parameters associated with the function call can be recorded. When updates are made to an object, differences between newer data and older data for a part of the object that changes as a result of a function call can also be identified and saved.

In one embodiment, the beginning state underlying the API is recorded. After some operations are performed, potentially changing the underlying state, the difference between the beginning state and an ending state of the API can be determined, and a list of API calls that return the ending state to the beginning state can be generated and executed.

The application may be a multi-threaded application, in which case the function calls for each thread of the application are recorded to individual queues. The function calls can be replayed in a single thread in order from earliest to latest based on a time-stamp associated with each of the function calls.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on date bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "recording," "operating," "maintaining," "manipulating," "replaying," "generating," "identifying," "saving," "determining," "creating," "displaying," "intercepting," "writing," "executing" or the like, refer to actions and processes (e.g., flowchart 600 of FIG. 6) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments of the invention can be implemented as computer-executable instructions, such as program modules (FIGS. 2 and 3), residing on some form of computer-usable storage medium executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable storage media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Figure 1:
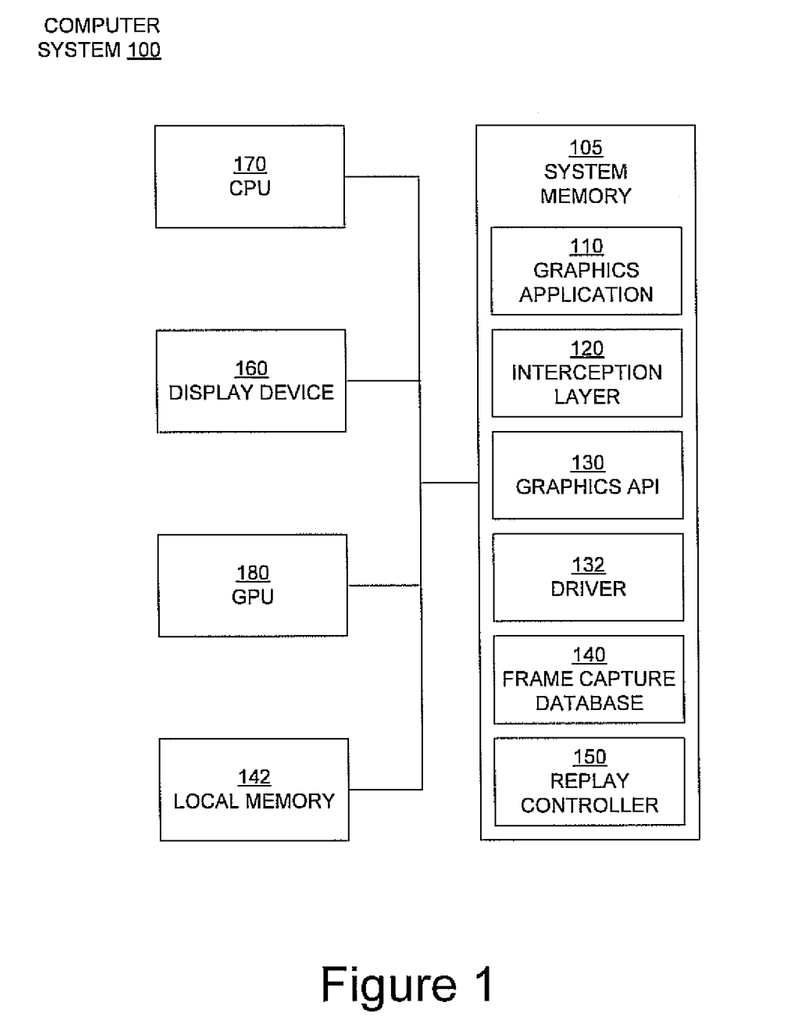
FIG. 1 is a block diagram of an example of a computer system upon which embodiments in accordance with the invention can be implemented.

FIG. 1 is a block diagram of a computer system 100 upon which embodiments according to the present invention may be implemented. The computer system may be implemented as, for example, a desktop computer, laptop computer, notebook computer, a video game console, a cell phone, or the like. The computer system in FIG. 1 is depicted as including certain components; however, it may include components in lieu of or in addition to those components.

In the example of FIG. 1, the computer system includes a graphics processing unit (GPU) 180 that is coupled to a central processing unit (CPU) 170 and a local memory 142. The computer system also incorporates or is coupled to a display device 160.

In addition, the computer system includes a system memory 105 coupled to the CPU. Program modules resident in the system memory include a graphics application 110, an interception layer 120, a graphics application programming interface (API) 130, a driver 132, a frame capture database 140, and a replay controller 150, which are described further in conjunction with FIGS. 2 and 3, below.

Figure 2:
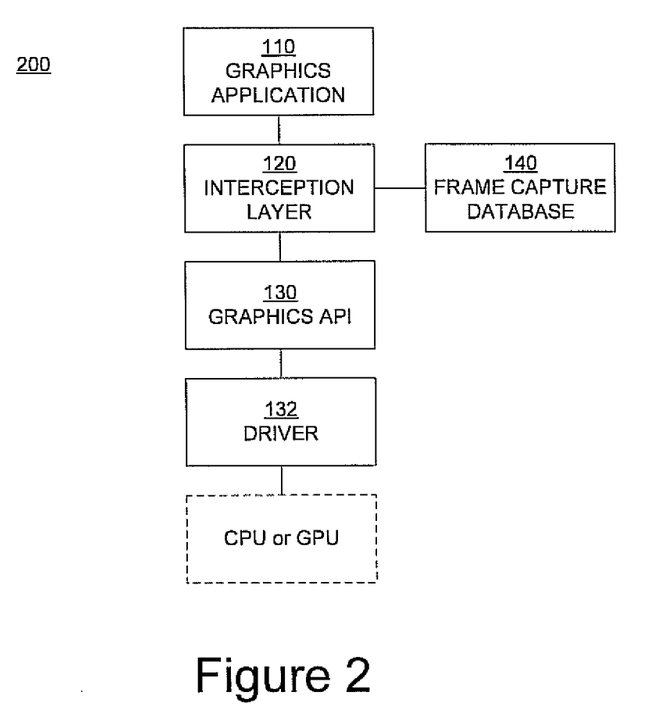
FIG. 2 is a block diagram showing an interception layer between an application and an application programming interface according to an embodiment of the invention.

With reference to FIG. 2, in one embodiment, a debugging and performance analysis system 200 includes an interception layer 120 that is situated between a graphics application 110 and a graphics API 130 (e.g., OpenGL, Direct3D, G3D, etc.). In general, the graphics application, interception layer, API, and driver 132 are implemented as computer-executable instructions residing on a computer-readable medium.

The graphics application, in general, includes different programs referred to as shaders that are configured to perform different types of graphics rendering tasks/operations. The graphics application may utilize different API function calls, such as the well-known draw call, to perform the different types of tasks. To render a frame of data, multiple tasks (e.g., pixel shading, vertex shading, etc.) may be performed and multiple function calls may be needed. Before executing a task, the graphics application may transmit a function call to the API, to set or change a setting for a render state. The API then passes the setting to the driver, which makes the appropriate changes to the GPU or CPU.

The interception layer may be different for different APIs; that is, the interception layer may be specific to a particular API or version of an API. In one embodiment, all intercepted API function entry points and returned objects are wrapped so that any call to any API element is known and filtered by the interception layer. A mapping of external to internal API object handles can also be maintained in a database inside the interception layer.

The code for the interception layer can be written by hand. Alternatively, the code can be written automatically, starting with a framework that is generated by parsing and processing the header files (e.g., include files) that define the API functions and objects. The latter approach is generally more efficient. Also, with the latter approach, it is easier to make updates to the interception layer when newer and different versions of the API are released.

Once the interception layer is in place, the debugging and performance analysis system has the ability to control the lifetime of an object (a resource, e.g., an index buffer, a constant buffer, textures, a render target, shaders, a vertex buffer, etc.). This is important to a real-time capture mechanism because, when a particular frame is being replayed, it is undesirable to create and destroy (delete) an object multiple times, yet it remains desirable to be able to replay all of the function calls so that an application developer has a realistic and complete recording of what the graphics application was doing when the frame was being processed for rendering.

In one embodiment, real-time capture and object persistence are achieved by managing a reference count for each object. Such a reference count may be explicit to the API, or internally maintained by the real-time capture system. Conventionally, it is possible for an application to release an object (e.g., a vertex buffer) during a frame, in which case the object is destroyed (deleted). But to replay the frame, the object may still be needed. According to an embodiment of the invention, the API is in essence fooled into not destroying the object by manipulating the reference count for that object, such that the API behaves as if there is still at least one more reference remaining for the object.

In general, each time an object is referenced, a reference count for that object is incremented; when a reference to the object is removed, then the reference count for that object is decremented. Conventionally, when the reference count reaches zero, the object is deleted. According to embodiments of the invention, the object is not necessarily deleted if the application's reference count has a value of zero. Instead, the interception layer maintains a secret reference to the object, or the object may be deleted only after replay, or any of a variety of different programming tricks can be used to control the reference count for an object.

Continuing with reference to FIG. 2, while the graphics application is running (and no capture is being performed, and no replay is happening), the interception layer does not necessarily do anything beyond keeping track of the state of the API (e.g., what settings are set, what objects are selected, etc.). That is, the interception layer acts as a pass-through for function calls when an application is running but frame capture is not being performed; the interception layer is transparent to both the application and the API.

Once a capture is triggered, function calls, including associated parameters, can be observed and written to a frame capture database 140. Changes to objects can also be saved. Many calls are immutable, which means that they do not change anything about the object itself, but just change the state of the API. These will result in simple and relatively small entries to the frame capture database. For example, the function that was called (the function identifier, fID)) can be recorded, and the parameters (e.g., arguments, references, objects) associated with that function can also be recorded.

Some functions can change the contents of an object. However, when the replay happens, it may be necessary to restore that object to its original state. Also, some of the objects can represent large amounts of memory (either on the CPU or on the GPU), and therefore simply copying the entire buffer may not be efficient. In order to reduce this overhead, a versioning scheme can be used to monitor what part of the object changes with a given call and to save the differences between original data and new data. This can be accomplished by using operating system or CPU features in order to make sure that the difference is relatively small.

For example, in a frame, the vertex buffer may be locked and modified more than once. However, only a relatively small portion of the vertex buffer may be modified from one lock to the next; some parts of the vertex buffer may not change from their initial state. To reduce the amount of memory consumed, only the portion of the data/vertex buffer that changed may be saved. For example, the initial state of the buffer at time zero is saved, and each change after that (the difference from one revision to the next) is separately saved.

Figure 3:
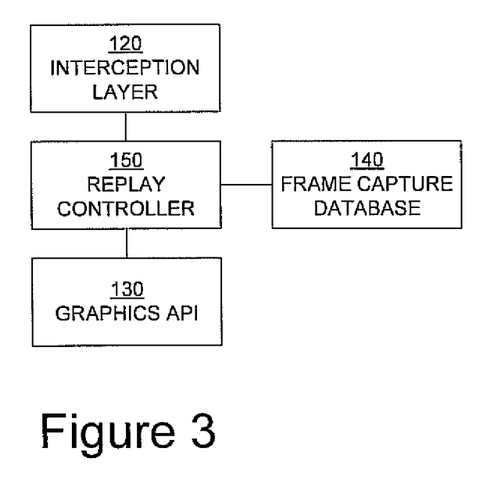
FIG. 3 is a block diagram showing a replay controller according to an embodiment of the invention.

With reference to FIG. 3, in one embodiment, a replay controller 150 controls frame replay. The replay controller can take control of an application thread from the graphics application 110, and then can replay the function bundles that are inside the frame capture database 140. The replay controller can make function calls as if the graphics application was making those calls.

During replay of a frame, an internal loop within the replay controller is entered, which resets the state of the graphics API 130 to the beginning of the frame. The same frame can be replayed repeatedly (as many times as desired), in order to collect enough data to identify bottlenecks or hotspots, for example. Furthermore, the same function call (e.g., the same draw call) may be repeated. After the current debugging/analysis is complete, control is returned to the graphics application.

When the frame of interest is replayed, each API call results in a call to the original API entry point, just as with the originating graphics application. For calls that modify the data within an object, the call is a combination of the original call to modify and a lookup into the object version information for the actual change to the object's data.

The discussion above is presented within the context of a single frame of interest. However, that discussion can be extended to analysis of multiple frames, in particular a sequence of two or more frames. In other words, information can be gathered for a particular frame or for a sequence of multiple frames. In this manner, a developer can evaluate dependencies within a frame, and can also evaluate dependencies across multiple frames.

It may be necessary to restore the API state from the end of the frame(s) replay to the beginning of the frame(s) replay. This is accomplished by determining the difference of the API's end state from the API's beginning state, and constructing a string of entries in an API capture database (not shown in the figures) that restores the API state to the beginning of the frame. This allows the replay system to be simpler and to not have to have special case code to manage this functionality. The entries can be played after the replay of the frame(s) is complete as part of the frame capture.

More specifically, as an application is running, it can modify the state of the API. At the end of each frame, the API state can be different from what it was at the beginning of the frame. According to an embodiment of the invention, the entire state of the API is shadowed inside the interception layer 120. When frame capture is started, the state of the API is saved; when the end of the frame is reached, the difference between the beginning-of-frame state and the end-of-frame state is determined and a list of API calls that return the end-of-frame state to what it needs to be at the beginning of the frame can be constructed.

Also, when the frame capture is serialized (saved to disk), then a code snippet can be constructed that changes the API state from its default state to what it needs to be at the beginning of the frame. In frame replay, the replay controller creates the objects that have been serialized, and also plays the code snippet to move the API state from the default state to the state needed at the beginning of the frame.

While performing a capture in general, and a live (real time) capture in particular, it may be necessary to handle multi-threaded applications. These types of setups introduce additional timing and synchronization issues. To address these issues, in one embodiment, the function calls for each thread are captured in a separate, per-thread database (analogous to the frame capture database 140 on a per-thread basis) with a time stamp on each entry. Each thread that makes a function call to the API can have its own database. At replay time, the replay is performed using a single thread that accesses the per-thread function call databases to identify the call with the earliest time stamp, and then pulls from the databases and executes it. In one such embodiment, the API calls are queued in their respective databases, with the youngest call for the first thread at the head of queue of its database, the youngest call for the second thread at the head of the queue for its database, and so on. The queue headed by the youngest call is identified and that call is then executed, and the process is repeated.

Once a frame capture database is constructed, a number of post-processing steps can be run, mining the database for interesting patterns. In essence, a database exists that includes each and every function call that was made. The database can be traversed to produce, for instance, a listing of inter-call dependencies. These dependencies can be especially important in graphics because rendering/draw calls early in a frame produce results that are used later in a frame. This means that errors early in a frame may not be apparent at first, but can cause issues when the results are used later. Also, if later calls will use the results of earlier ones, the later calls cannot execute until the earlier ones have completed, potentially introducing a performance issue.

The inter-call dependencies can be first order and second order (and third order, etc.), such as a draw call that directly impacts a later call, or a draw call that impacts a draw call that impacts a draw call, respectively, and so on. For example, a draw call may be issued to read an object (resource) before that object is finished being written to, which may cause a stall in the graphics pipeline unless detected and addressed.

Figure 4:
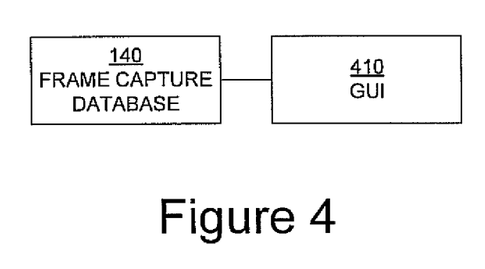
FIG. 4 is a block diagram showing a graphical user interface (GUI) coupled to a database according to an embodiment of the invention.
Figure 5:
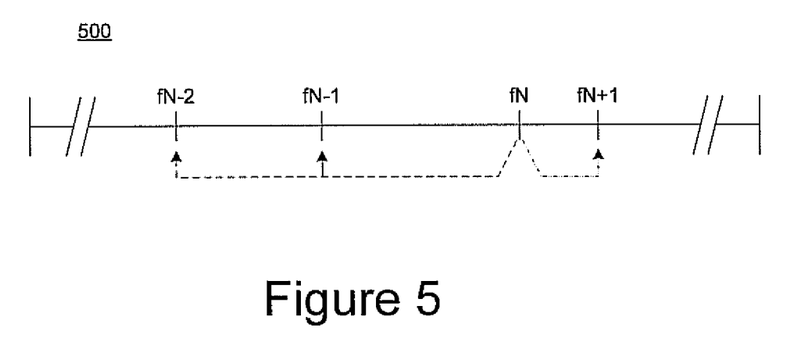
FIG. 5 is an example of a GUI according to an embodiment of the invention.

In one embodiment, the information in the frame capture database is rendered in a graphical user interface (GUI) 410 (FIGS. 4 and 5). In one such embodiment, the GUI includes a dependency graph 500 in which colored arrows are used to show the dependencies for a given draw call (draw call fN); in FIG. 5, the different colors are represented by different line formats. The information presented in the GUI may span multiple frames or a single frame. In the example of FIG. 5, the draw calls fN−2 and fN−1 are first order producers, and the draw call fN+1 is a first order consumer, of the draw call fN. The draw calls can be displayed on a timeline that spans one or more frames. Accordingly, a developer can perhaps rearrange the order in which operations are performed in order to put more time between the previous draw calls (e.g., the most immediately preceding draw call fN−1) and draw call fN.

Although useful for real-time capture and replay, embodiments according to the invention are not so limited. For example, by writing out the API call database, the object list with versions, and some startup entries, the state of the replay can be reconstructed for post-mortem analysis. Similar to the types of calls constructed to return the API state from the end-of-capture state to the beginning-of-capture state described above, a list of API calls to create the objects can be constructed and put in their initial or revised state, and the API can be changed from its default state to a start-of-capture replay state.

Figure 6:
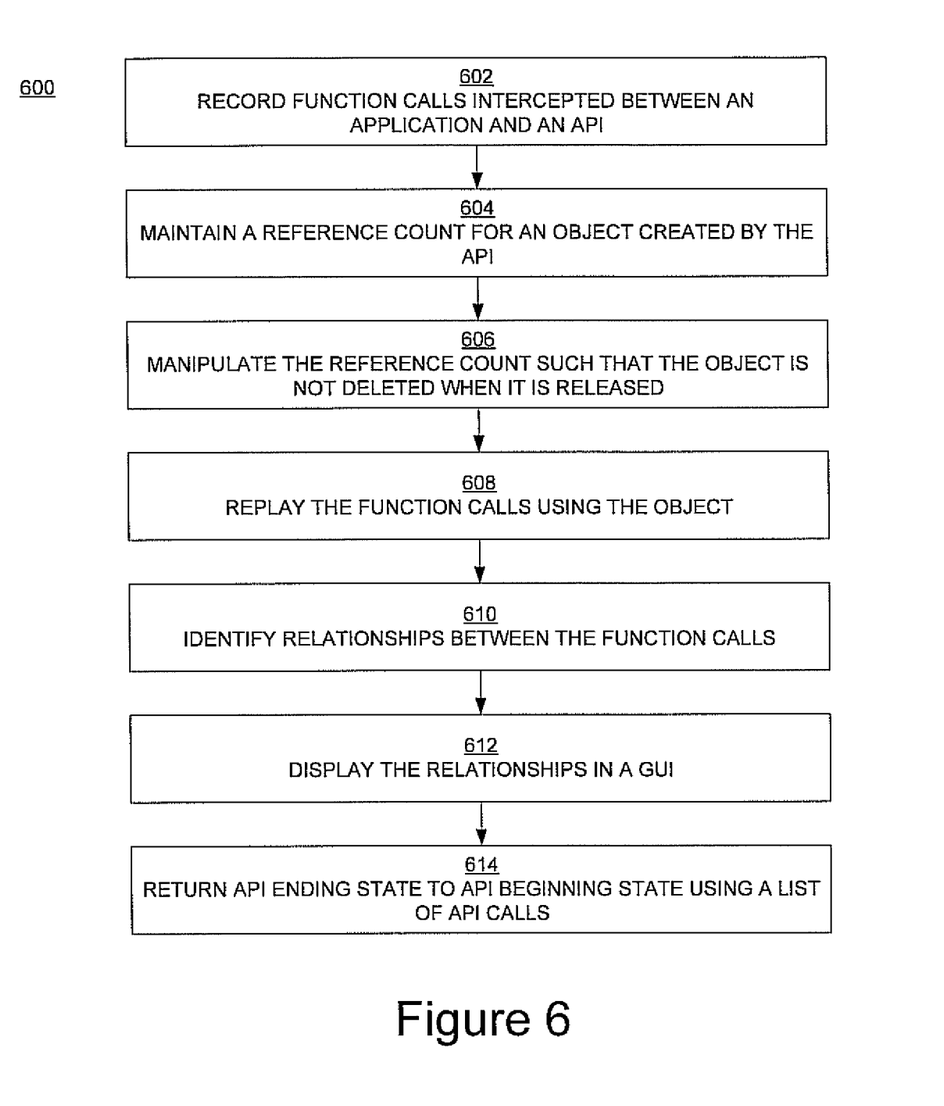
FIG. 6 is a flowchart illustrating embodiments of computer-implemented methods for debugging and analyzing the performance of a graphics application.

FIG. 6 is a flowchart 600 illustrating embodiments of computer-implemented methods for debugging and analyzing the performance of a graphics application. The flowchart can be implemented as computer-executable instructions residing on some form of computer-readable storage medium.

In block 602, function calls between a graphics application and an API are recorded while operating on a frame of interest. An identifier for a function call and parameters associated with the function call can be recorded. Differences between newer data and older data for a part of the object that changes as a result of a function call can also be identified and saved.

The application may be a multi-threaded application, in which case the function calls for each thread of the application are recorded. The function calls can be replayed in a single thread in order from earliest to latest based on a timestamp associated with each of the function calls.

In block 604, a reference count is maintained for an object created by the API. In block 606, the reference count can be manipulated such that the API does not delete the object when the object is released by the application. In block 608, the function calls can then be replayed using the object. In block 610, relationships between the function calls can then be identified.

In block 612, in one embodiment, a GUI that shows relationships between the function calls is generated. In one such embodiment, the GUI includes colored arrows that point from a first function call to a second function call that utilizes an object also utilized by the first function call.

In block 614, in one embodiment, the beginning state of the API is recorded. The difference between the beginning state and an ending state of the API can be determined, and a list of API calls that return the ending state to the beginning state can be generated and executed.

In summary, embodiments according to the invention use real-time capture, while an application is still running and using an object that the application has already allocated, to allow for a minimal overhead, quick turnaround solution for debugging and performance analysis. This information can be graphed on a single frame or multi-frame timeline with colored arrows to indicate producers and consumers for API calls. This data can be used in a single GPU and in multi-GPU setups where the results of these dependencies may differ, but the implications are nonetheless the same.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A non-transitory computer-readable medium having stored thereon computer-executable instructions that, responsive to execution by a computer system, cause said computer system to perform operations comprising:
   recording function calls between a graphics application and a graphics application programming interface (API) while operating on a frame of interest;
   maintaining a reference count for an object created by said graphics API, wherein said reference count is incremented each time said object is referenced and decremented each time a reference to said object is removed;
   manipulating said reference count such that said graphics API behaves as if there is at least one remaining reference for said object and does not delete said object when said reference count for said object reaches zero so that said object remains intentionally available when said frame of interest is subsequently replayed;
   recording a beginning state of said graphics API;
   determining a difference between said beginning state and an ending state of said graphics API;
   generating a list of graphics API calls that return said ending state to said beginning state; and
   after said manipulating, replaying said frame of interest including repeating said function calls and using said object during said replaying.

2. The non-transitory computer-readable medium of claim 1 wherein said operations further comprise identifying relationships between said function calls.

3. The non-transitory computer-readable medium of claim 1 wherein said operations further comprise generating a graphical user interface (GUI) that shows relationships between said function calls.

4. The non-transitory computer-readable medium of claim 3 wherein said GUI comprises colored arrows that point from a first function call to a second function call that utilizes an object also utilized by said first function call.

5. The non-transitory computer-readable medium of claim 1 wherein said recording comprises recording an identifier for a function call and parameters associated with said function call.

6. The non-transitory computer-readable medium of claim 1 wherein said operations further comprise:
identifying differences between newer data and older data for a part of said object that changes as a result of a function call; and
saving said differences.

7. The non-transitory computer-readable medium of claim 1 wherein said application is a multi-threaded application and said recording is performed for each thread of said application, and wherein said replaying further comprises replaying said function calls in a single thread in order from earliest to latest based on a time-stamp associated with each of said function calls.

8. A non-transitory computer-readable medium having stored thereon computer-executable components for analysis of a frame of interest processed by a graphics application, said components comprising:
a graphics application programming interface (API) operable for creating an object used by said graphics application, wherein a reference count for said object is incremented each time said object is referenced and decremented each time a reference to said object is removed, wherein said reference count is manipulated such that said graphics API behaves as if there is at least one remaining reference for said object and does not delete said object even if the number of times said reference count is incremented and the number of times said reference count is decremented are equal so that said object remains available to said graphics application at any time said frame is subsequently replayed;
an interception layer operable for intercepting function calls between said graphics application and said graphics API and for writing information about said function calls to a first database;
a replay controller operable for replaying said frame after said reference count is manipulated, said replaying including repeating said function calls and using said object, wherein said replay controller is further operable for executing a list of graphics API calls that return said graphics API from its ending state to an earlier state; and
a graphical user interface (GUI) operable for displaying relationships between said function calls.

9. The non-transitory computer-readable medium of claim 8 wherein said GUI comprises colored arrows that point from a first function call to a second function call that utilizes an object also utilized by said first function call.

10. The non-transitory computer-readable medium of claim 8 wherein said information comprises an identifier for a function call and parameters associated with said function call.

11. The non-transitory computer-readable medium of claim 8 wherein said information comprises differences between newer data and older data for a part of said object that changes as a result of said function call.

12. The non-transitory computer-readable medium of claim 8 wherein said graphics application is a multi-threaded application and wherein function calls for each thread of said graphics application are written to a respective database, wherein further said replaying comprises replaying said function calls in a single thread in order from earliest to latest based on a time-stamp associated with each of said function calls.

13. A system comprising:
a processor; and
memory coupled to said processor and having stored therein instructions that, responsive to execution by said system, cause said system to perform operations comprising:
generating in real time a database comprising a record of function calls between a graphics application and a graphics application programming interface (API) while operating on a frame of interest;
generating a graphical user interface (GUI) that displays relationships between said function calls, wherein said GUI comprises colored arrows that point from a first function call to a second function call that utilizes an object also utilized by said first function call;
maintaining a reference count for an object created by said graphics API, wherein said reference count is incremented each time said object is referenced and decremented each time a reference to said object is removed, wherein said reference count is manipulated such that said graphics API behaves as if there is at least one remaining reference for said object and does not delete said object even if the number of times said reference count is incremented and the number of times said reference count is decremented are equal so that said object is available when said frame of interest is subsequently replayed;
recording a beginning state of said graphics API;
determining a difference between said beginning state and an ending state of said graphics API;
generating a list of graphics API calls that return said ending state to said beginning state; and
after said reference count is manipulated, replaying said frame of interest including repeating said function calls and using said object during said replaying.

14. The system of claim 13 wherein said operations further comprise recording an identifier for a function call and parameters associated with said function call.

15. The system of claim 13 wherein said operations further comprise:
identifying differences between newer data and older data for a part of said object that changes as a result of a function call; and
saving said differences.

16. The system of claim 13 wherein said application is a multi-threaded application and functions calls are recorded for each thread of said application, wherein further said function calls are replayed in a single thread in order from earliest to latest based on a time-stamp associated with each of said function calls.

* * * * *